UNITED STATES PATENT OFFICE.

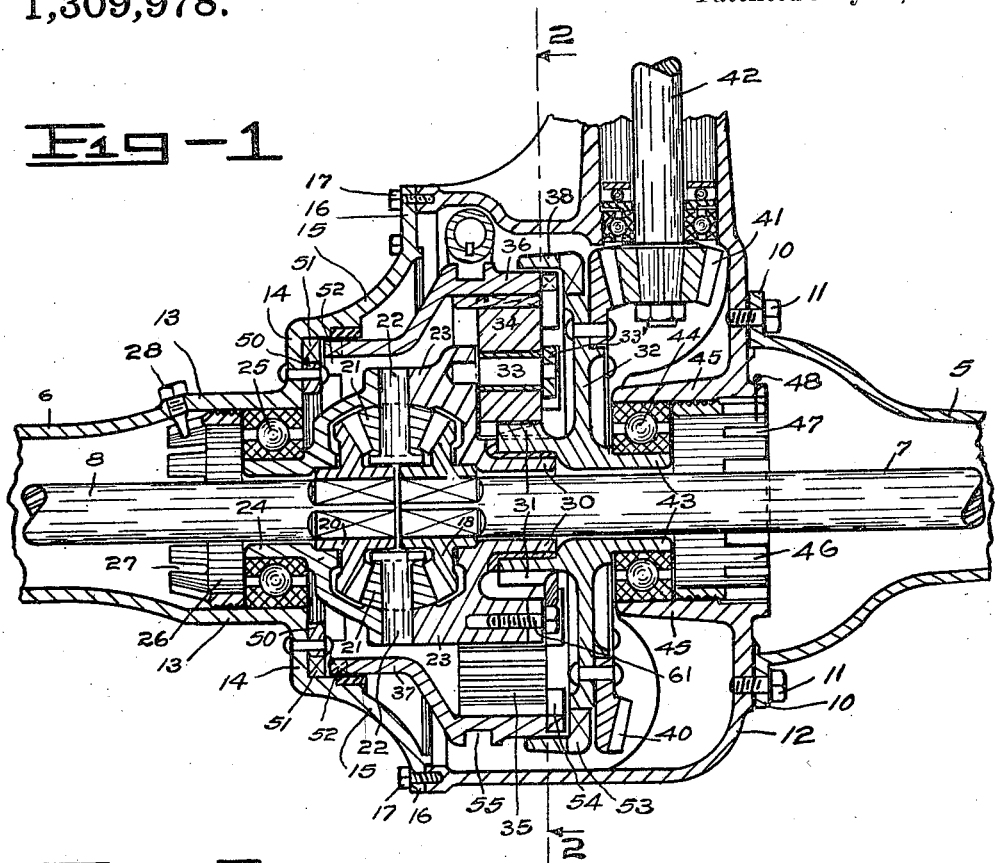
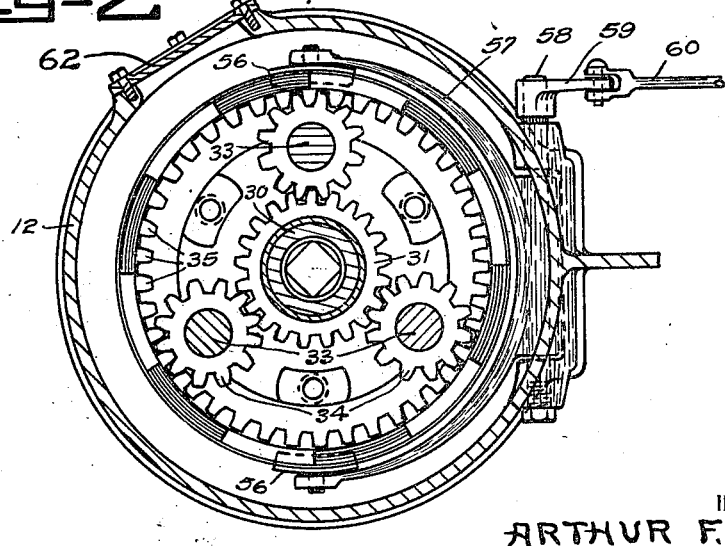

ARTHUR F. BAKER, OF SEDRO WOOLLEY, WASHINGTON, ASSIGNOR TO THE PERFECTO GEAR DIFFERENTIAL CO., OF SEATTLE, WASHINGTON, A CORPORATION.

DRIVING-GEAR FOR MOTOR-VEHICLES.

1,309,978.     Specification of Letters Patent.     Patented July 15, 1919.

Application filed May 28, 1918. Serial No. 237,156.

*To all whom it may concern:*

Be it known that I, ARTHUR F. BAKER, a citizen of the United States, residing at Sedro Woolley, in the county of Skagit and State of Washington, have invented a new and useful Improvement in Driving-Gears for Motor-Vehicles, of which the following is a specification.

This invention relates to improvements in driving-gears for motor vehicles and is in the nature of an improvement on the vehicle driving gear shown and described in my co-pending application, Serial No. 214,230, filed January 28, 1918.

The object of this improvement is to provide a driving gear of a strong and simple form of construction that may be directly connected with the differential mechanism of a motor vehicle and that has two driving positions whereby the differential may selectively be driven at a high or a low rate of speed, and a neutral position by which the driving mechanism may be rendered inoperative.

Another object is to simplify the construction of driving gears of the form shown and described in the application above referred to and to construct a more efficient gear of this class having fewer working parts.

Another object is to simplify gear shifting mechanism and render it more efficient and to dispose all of the working parts thereof within a gear housing.

The invention consists in the novel construction, adaptation and combination of parts of a vehicle driving gear, as will be more clearly hereinafter described and claimed.

In the accompanying drawings, Figure 1 is a view substantially in longitudinal mid-section of a vehicle driving gear constructed in accordance with this invention, and Fig. 2 is a view in cross section of the same substantially on broken line 2—2 of Fig. 1.

Referring to the drawings, throughout which like reference numerals designate like parts, the numerals 5 and 6 designate two axle housings within which are disposed floating differential axles 7 and 8 that may extend outwardly in well known manner and be connected with the driving wheels of a vehicle not shown.

The axle housing 5 is enlarged at the inner end and provided with a flange 10 that is connected by set screws 11 with a transmission gear housing 12.

The axle housing 6 is enlarged at the inner end as at 13, thence flanged as at 14, thence provided with a bell shaped portion 15 and thence terminates in a flange 16 that is secured to the differential gear housing 12 by set screws 17.

It will thus be seen that the gear housing 12 is rigidly connected with the differential axle housings 5 and 6.

The inner ends of the differential axles 7 and 8 are square in cross section and fit within correspondingly shaped receptacles in the hubs of bevel pinions 18 and 20.

The bevel pinions 18 and 20 are spaced apart and mesh with other bevel pinions 21 that are mounted on pins or studs 22 that project outwardly through a two part annular cage 23 so that when the cage 23 is turned the bevel pinions 21 will be carried therewith and will rotate the pinions 18 and 20 and shafts 7 and 8 in the manner well known to differential gears of this type.

The differential gear cage 23 is provided on one end with an extension 24 that is journaled in a ball bearing 25 disposed within the enlarged portion 13 of the axle housing 6. The bearing 25 is supported against end thrust by a sleeve 26 that is adapted to screw within the enlarged portion 13 of the axle housing 6 and is provided at a plurality of intervals with slots 27 for the reception of the end of a set screw 28 by means of which it is locked in a desired position.

The opposite end of the gear cage 23 is provided with an extension 30 that is journaled within the hub portion of a gear wheel 31 that is formed integral with a concentrically arranged disk 32. The gear cage 23 is provided on one side with three outwardly projecting fixed studs 33 upon which are mounted pinions 34 that mesh with the gear wheel 31 and with an internal or ring gear 35 that is formed within an annular ring member 36.

The annular member 36 is provided on one end with a contracted portion 37 whose outer end is supported for rotation within the bell shaped part 15 of the axle housing 6.

The end of the annular member 36 opposite to the contracted portion 37 is supported for rotation within an annular flange 38 that is formed on the peripheral portion of the disk 32.

The disk 32 is provided on the side opposite the flange 38 with a fixed bevel gear 40 that is adapted to mesh with a pinion 41 on the driving shaft 42 of the vehicle.

The side of the disk 32 opposite the gear wheel 31 is provided with an extension 43 that is journaled within a ball bearing 44. The ball bearing 44 is supported within an inwardly directed circular flange 45 that is formed integral with the transmission housing 12.

The ball bearing 44 may be held against end thrust by a sleeve 46 that is adapted to screw into the flange portion 45 and is provided on its outer end with slots 47 through which a key 48 may be inserted to lock the sleeve 46 in a desired position.

50 is a ring that is rigidly secured to the inner surface of the flange portion 14 of the axle housing 6 and is provided with frequent cut away portions 51 around its periphery that serve as receptacles for clutch jaws 52 on the end of the member 37 so that when the member 37 is moved to the left from the position shown in Fig. 1, the jaws 52 will enter the recesses 51 and the ring member 36 will be rigidly locked to the differential housing.

The peripheral portion of the disk 32 adjacent its junction with the flange 38 is cut away at frequent intervals as indicated at 53 to form recesses for the entrance of clutch jaws 54 on the end of the member 36 so that when the member 36 is moved to the right from the position shown in Fig. 1 the jaws 54 will enter the recesses 53 and lock the ring member 36 to the disk 32.

The member 36 is provided on its exterior surface with an annular groove 55 within which are disposed shifter shoes 56 that are pivotally connected with the ends of a shifter fork 57. The medial portion of the shifter fork 57 is rigidly connected to a stub shaft 58 that is provided on one end with a lever arm 59 that is connected with a link 60 by means of which the stub shaft 58 may be rotated to move the shifter fork 57 and shift the member 36 and its extension 37.

The outer ends of the studs 33 are all connected with a ring or spider 33' which is fixedly secured to the differential cage 23 at one or more points by set screws 61, as shown in Fig. 1. The ring 33' serves to tie the outer ends of the three studs 33 together, assists in forming a rigid support for the pinions 34.

The transmission housing 12 is provided on its top side with an opening that is adapted to be covered by a removable plate 62 and through which lubricant may be introduced.

When the ring member 36 is in the position shown in Fig. 1 the clutch jaws 52 and 54 are all disengaged and the gears are neutral.

If the shaft 42 is rotated while the annular member 36 is in this position the gear 40, pinions 34 and internal gear 35 will run idly without driving the axles 7 and 8.

If the ring member 36 is moved to the right from the position shown in Fig. 1 so that the jaws 54 engage within the recesses 53 in the disk 32, then the internal gear 35 will be locked to the disk 32 and the pinions 34 will be carried around with the ring 36 and at the same rotary speed as such ring 36 and will drive the differential axles 7 and 8 at the same speed of rotation as the disk 32.

If the annular member 36 is moved to the left from the position shown in Fig. 1 so that the jaws 52 on the extension 37 enter the openings 51 in the ring 50, then the annular member 36 together with the ring gear 35 will be fixedly locked to the differential housing and axle housings and if the shaft 42 is driven while the ring 36 is thus held in a fixed position the gear 31 will be rotated and will cause the pinions 34 to roll around within the ring gear 35 and carry the differential cage 23 with them at a reduced speed, thereby rotating the differential axles 7 and 8 at the slower speed than the disk 32.

It will thus be seen that when the annular member 36 is locked to the disk 32 a direct drive is formed and the differential axles 7 and 8 are driven at the same rate of speed as the disk 32, but when the annular member 36 is locked to the differential housing the driving force is exerted through the gear wheel 31 which causes the pinions 34 to roll around within the internal gear 35 at a reduced rate of speed, thereby forming a low speed drive.

This differential mechanism may be advantageously used on either new or rebuilt motor vehicles and owing to the fact that it provides a low speed, a high speed and a neutral position the usual speed gear shifting device of the motor vehicle may be dispensed with if desired.

This transmission is so designed and arranged that all the working parts are positioned within the transmission housing so that they may be constantly immersed in a bath of oil.

What I claim as new and desire to protect by Letters Patent, is:—

1. A transmission of the class described comprising a differential gear, a cage for said gear, pinions mounted for rotation on said cage, a rotatably mounted disk having clutch recesses formed in the periphery thereof, a gear wheel on the hub portion of said disk and disposed to mesh with said pinions, a ring member surrounding said cage, an internal gear on said ring member and disposed to mesh with said pinions, means for driving said disk, a fixed axle housing, a clutch member secured within said housing, clutch elements on both ends of said ring member and means for shifting said ring member to selectively lock said ring member to said disk or to said axle housing.

2. A vehicle driving gear comprising a differential gear, a cage for said differential gear, stud pins projecting outwardly from said gear cage, pinions mounted for rotation on said stud pins, a ring member surrounding said gear cage and movable sidewise with respect thereto, an internal gear within said ring member and disposed to mesh with said pinions, a rotatably mounted disk having clutch recesses therein, an annular peripheral flange on said disk adapted to extend over the periphery of said ring member, a fixed axle housing having clutch recesses therein, clutch elements on both ends of the ring member, the clutch elements on one end of said ring member being adapted to engage and lock within the clutch recesses in said disk and the clutch elements on the opposite end of said ring member being adapted to engage and lock within the clutch recesses in said housing means for driving said disk, and a gear wheel secured to the hub portion of said disk and adapted to mesh with said pinions on said differential gear cage.

3. In a transmission of the class described the combination with differential axles, of a differential gear connected therewith, a fixed axle housing, a cage for said differential gear, a disk mounted for rotation within said housing, means for driving said disk, an annular ring member disposed adjacent said disk, an internal gear within said ring member, clutch elements on each end of said ring member, clutch elements in said disk to receive said clutch elements on one end of said ring member, clutch elements in said axle housing to receive the clutch elements on the other end of said ring member, means for shifting said ring member to selectively cause it to be locked to said disk or said axle housing, a gear wheel fixedly mounted on the hub portion of said disk and a plurality of pinions mounted for rotation on said differential gear cage and adapted to mesh with said internal gear and with said gear wheel on the hub of said disk.

4. In a transmission of the class described the combination with differential axles, of a differential gear connected therewith, a cage for said differential gear, a fixed axle housing, a disk mounted for rotation within said housing, means for driving said disk, an annular ring member disposed adjacent said disk and supported for rotation within said axle housing one end of said ring being of reduced diameter, clutch elements on each end of said ring member, recesses in said disk to receive the clutch elements on the larger end of said ring member, a clutch member fixedly secured to said axle housing to receive the clutch elements on the smaller end of said ring member, a shifting fork engageable with said ring member, means for moving said shifting fork to selectively lock said ring member to said disk or to the axle housing, a gear wheel fixedly mounted on the hub portion of said disk and a plurality of pinions mounted for rotation on said differential gear cage and adapted to mesh with said internal gear and with said gear wheel on the hub of said disk.

5. In a transmission of the class described the combination with the differential axles of a motor vehicle of a differential gear connected therewith, a fixed housing for the transmission, a cage for said differential gear, a disk rotatably mounted within the fixed housing, a bevel gear secured to the periphery of said disk, a bevel pinion in driving engagement with said bevel gear, an internal gear mounted within the said axle housing, clutch elements on each end of said internal gear, means for moving said internal gear sidewise to selectively cause said clutch elements to lock said internal gear to said disk or to said axle housing, pinions rotatably mounted on said differential gear cage and disposed in mesh with said internal gear and a gear wheel secured to said disk and adapted to mesh with said pinions.

Signed by me at Seattle, Washington, this 7th day of May, 1918.

ARTHUR F. BAKER.

Witnesses:
R. J. COOK,
D. C. KUHNS.